US011841415B2

(12) United States Patent
Yoon (10) Patent No.: US 11,841,415 B2
(45) Date of Patent: Dec. 12, 2023

(54) APPARATUS, METHOD AND SYSTEM FOR DETERMINING SPEEDING OF VESSEL BASED ON ARTIFICIAL INTELLIGENCE

(71) Applicant: KOREA OCEANIC AND ATMOSPHERIC SYSTEM TECHNOLOGY(KOAST), Seoul (KR)

(72) Inventor: Suk Young Yoon, Incheon (KR)

(73) Assignee: Korean Oceanic and Atmospheric System Technology (KOAST), Seoul (KR)

( * ) Notice: Subject to any disclaimer, the term of this patent is extended or adjusted under 35 U.S.C. 154(b) by 497 days.

(21) Appl. No.: 17/156,727

(22) Filed: Jan. 25, 2021

(65) Prior Publication Data

US 2022/0196816 A1    Jun. 23, 2022

(30) Foreign Application Priority Data

Dec. 23, 2020  (KR) .......................... 10-2020-0181472

(51) Int. Cl.
*G01S 11/14*  (2006.01)
*G10L 25/51*  (2013.01)
(Continued)

(52) U.S. Cl.
CPC ................. *G01S 11/14* (2013.01); *G01S 5/22* (2013.01); *G06N 5/04* (2013.01); *G06N 20/00* (2019.01);
(Continued)

(58) Field of Classification Search
CPC ... G01S 11/14; G01S 5/22; G01S 5/30; G01S 2205/04; G01S 5/20; G01S 15/584;
(Continued)

(56) References Cited

U.S. PATENT DOCUMENTS

| 2009/0048726 A1* | 2/2009 | Lofall ..................... B63B 79/20 |
| | | 701/21 |
| 2015/0025834 A1 | 1/2015 | Kaisha |
| 2022/0196816 A1* | 6/2022 | Yoon ....................... G01S 11/14 |

FOREIGN PATENT DOCUMENTS

| JP | 2019132800 A | 8/2019 |
| KR | 101152967 B1 | 6/2012 |

(Continued)

OTHER PUBLICATIONS

PCT International Search Report dated Sep. 23, 2021 for related PCT Application No. PCT/KR2020/018951. (3 pages).

*Primary Examiner* — Daniel Pihulic
(74) *Attorney, Agent, or Firm* — Olive Law Group, PLLC (57) ABSTRACT

Provided are an apparatus, a method, and a system for determining speeding of a vessel. According to an embodiment of the present disclosure, the method may include: receiving, by sound signal receiving apparatuses installed at at least two points, a sound signal of a first vessel operating at a preset section; extracting operation vibration information of the first vessel from each sound signal received by the sound signal receiving apparatuses installed at the at least two points; measuring an operation speed of the first vessel from each of the received sound signals; and constructing a database including operation speed range information matching the operation vibration information of the first vessel.

11 Claims, 5 Drawing Sheets

(51) Int. Cl.
　　　*G10L 21/0232*　　(2013.01)
　　　*G01S 5/22*　　　(2006.01)
　　　*G06N 20/00*　　(2019.01)
　　　*G06N 5/04*　　　(2023.01)
　　　*G06V 20/13*　　(2022.01)
　　　*G06F 18/24*　　(2023.01)

(52) U.S. Cl.
　　　CPC .......... *G06V 20/13* (2022.01); *G10L 21/0232* (2013.01); *G10L 25/51* (2013.01); *G06F 18/24* (2023.01)

(58) Field of Classification Search
　　　CPC .......... G06N 5/04; G06N 20/00; G06N 3/045; G06N 7/01; G06V 20/13; G10L 21/0232; G10L 25/51; G10L 21/0208; G06F 18/24; G08G 3/02
　　　See application file for complete search history.

(56) References Cited

FOREIGN PATENT DOCUMENTS

| | | | |
|---|---|---|---|
| KR | 1020190101275 B1 | 8/2019 | |
| KR | 102031212 B1 | 10/2019 | |
| WO | WO-2022139027 A1 * | 6/2022 | .............. G01S 11/14 |

\* cited by examiner

APPARATUS, METHOD AND SYSTEM FOR DETERMINING SPEEDING OF VESSEL BASED ON ARTIFICIAL INTELLIGENCE

CROSS-REFERENCE TO RELATED APPLICATIONS

This application claims the priority of Korean Patent Application No. 10-2020-0181472 filed on Dec. 23, 2020, in the Korean Intellectual Property Office, the disclosure of which is incorporated herein by reference.

BACKGROUND

Field

The present disclosure relates to an apparatus, a method, and a system for determining speeding of a vessel based on artificial intelligence, and more particularly, to an apparatus, a method, and a system for determining speeding of a vessel by using learning data about information on vibrations emitted during an operation of the vessel.

Description of the Related Art

In recent years, the International Maritime Organization (IMO) agreed to amend regulations for the prevention of air pollution from ships (MARPOL Annex VI), which improves fuel economy of existing vessels to that of new vessels in order to lower greenhouse gas emissions from vessels. Accordingly, the existing vessels are classified into various grades according to fuel economy, and vessels with poor fuel economy are subject to speed limits. This is because when vessels with poor fuel economy operate beyond speed limits, the vessels increase fuel consumption to increase emissions of pollutants.

In addition, the Korean government limits the maximum speed of vessels according to the maritime safety act, the act on ship's entrance and departure, and the like for the safety of maritime traffic when vessels navigate a specific area of a trade port.

In order to comply with such domestic and international norms, a method for controlling vessels by control personnel of the Vessel Traffic Service (VTS), a method for displaying a maximum speed limit of a vessel on various navigation devices such as a navigation chart, and an electronic chart, a GPS plotter, and the like may be considered. However, these methods cannot measure a speed of vessels in operation, and in particular, cannot control vessels that violate speed limits.

In order to supplement such a problem, a technology of installing a camera in a specific section on a route through which a vessel operates to measure the time when the vessel passes through the section or a technology of collecting radio waves from an automatic identification system (AIS) for a vessel to measure a speed of the vessel may be proposed. However, the measuring technology using the camera may be difficult to identify vessels in situations where a field of vision is limited due to cloud and mist, and the technology of collecting the radio waves from the automatic identification device for a vessel also has the limitation that it cannot but depend on information provided by the vessel to be controlled.

Next, as a technology that may be considered regardless of the situation where a field of vision is limited or the information provided by the vessel to be controlled, a technology of specifying a position of a vessel by collecting a sound generated in an ocean has been disclosed, but there is a need to develop a technology of additionally measuring a speed of a vessel to control whether the speed of the vessel exceeds a maximum speed limit of the vessel.

RELATED ART DOCUMENT

Patent Document

Korean Patent No. 1224907

SUMMARY

An object to be achieved by the present disclosure is to provide an apparatus, a method, and a system for identifying natural vibration information of a vessel to measure a speed of a vessel and control whether the speed of the vessel exceeds a maximum speed limit of the vessel.

Another object to be achieved by the present disclosure is to provide an apparatus, a method, and a system capable of detecting acoustic information on a speeding condition of a vessel by matching the unique information such as a type of vessel with the acoustic information according to an engine output of the vessel and databasing the matched information.

Still another object to be achieved by the present disclosure is to provide an apparatus, a method, and a system capable of determining an engine output sound that exceeds a maximum speed limit by learning acoustic information for each output of at least one vessel.

Still yet another object to be achieved by the present disclosure is to provide an apparatus, a method, and a system capable of complementing and verifying measurement precision of an operation speed of a vessel by combining visual information on the operation of the vessel using a camera.

Another technical challenge to be solved by the present disclosure is to provide an apparatus, a method, and a system for providing a collision warning service according to an operation speed detection of a vessel.

The objects of the present disclosure are not limited to the aforementioned objects, and other objects, which are not mentioned above, will be apparent to a person having ordinary skill in the art from the following description.

According to an aspect of the present disclosure, there is provided an apparatus for determining speeding of a vessel based on artificial intelligence including: one or more processors; a network interface receiving a sound signal from at least one sound signal receiving apparatus; a memory loading a computer program executed by the processor; and a database for matching and storing the sound signal and speed information of a vessel corresponding to the sound signal and a storage for storing the computer program, in which the program may include: an operation of extracting operation vibration information of a vessel in operation based on a sound signal received at a first point in time from each of a first sound signal receiving apparatus and a second sound signal receiving apparatus among the at least one sound signal receiving apparatus; an operation of receiving a sound signal at a second point in time from the first sound signal receiving apparatus and the second sound signal receiving apparatus; an operation of identifying a sound source of the second sound signal as the vessel by extracting a vibration component matching the operation vibration information from the sound signal at the second point in time; and an operation of identifying, based on the operation vibration information, an operation speed and an operation direction between the first point in time and the second point in time of the vessel.

The operation vibration information may be a combination of a natural vibration component generated by natural vibration of the vessel according to the structure and material of the vessel and a vibration component generated from an engine output or a screw rotation as the vessel operates.

The operation of extracting the operation vibration information of the vessel in operation may include: an operation of receiving a noise signal, in a state in which the sound signal of the vessel is not received, from each of the first sound signal receiving apparatus and the second sound signal receiving apparatus, before the first point in time; and an operation of extracting the operation vibration information of the vessel by canceling a frequency component of the noise signal with respect to the sound signal received at the first point in time.

The at least one sound signal receiving apparatus may further include a third sound signal receiving apparatus, the program may further include an operation of receiving the sound signal at the second point in time from the third sound signal receiving apparatus, and the operation of identifying a sound source of the second sound signal as the vessel may include an operation of second extracting a frequency component matching the operation vibration information from the sound signal at the second point in time received by the third sound signal receiving apparatus, and an operation of identifying the sound source of the second sound signal received by the second sound signal receiving apparatus as the vessel, based on the second extracted frequency component.

The operation of extracting the operation vibration information of the vessel in operation may include: an operation of receiving a plurality of sound signals from a plurality of vessels at the first point in time from each of the first sound signal receiving apparatus and the second sound signal receiving apparatus; an operation of identifying the plurality of vessels corresponding to the plurality of sound signals based on the operation vibration information classified by a preset vibration learning model; and an operation of specifying the vessel among the plurality of vessels based on the extracted operation vibration information.

According to another aspect of the present disclosure, there is provided a system for determining speeding of a vessel based on artificial intelligence including: at least one sound signal receiving apparatus receiving a sound signal generated from a first vessel; a camera installed at at least two points on a preset section in which the first vessel operates and obtaining an image of the first vessel in operation; and an apparatus for determining speeding of a vessel extracting natural information of the first vessel through a preset vessel learning model based on an image acquired from the camera, extracting operation vibration information of the first vessel based on a sound signal received for a first period from the sound signal receiving apparatus, matching and storing the extracted natural information of the first vessel and the extracted operation vibration information of the first vessel, measuring an operation speed of the first vessel based on the sound signal received for the first period, and matching and storing the operation speed of the first vessel and the operation vibration information of the first vessel.

The apparatus for determining speeding of a vessel may generate speed range information of the first vessel corresponding to the sound signal of the first vessel as the stored operation vibration information for the first period and the operation speed of the first vessel are learned through a preset vibration learning model.

The apparatus for determining speeding of a vessel may extract operation vibration information of a second vessel from a sound signal of the second vessel when the sound signal of the second vessel in operation for the second period is received from the sound signal receiving apparatus, and determine whether the second vessel is speeding based on the extracted operation vibration information of the second vessel and the generated speed range information of the first vessel.

The apparatus for determining speeding of a vessel may measure the speed of the second vessel operating at the preset section through the camera, and verify a result of determining whether the second vessel is speeding based on the measured speed of the second vessel.

The apparatus for determining speeding of a vessel may generate the natural information of the second vessel using the preset vessel learning model based on the extracted natural information of the first vessel, match and store the generated natural information of the second vessel and the extracted operation vibration information of the second vessel, measure the operation speed of the second vessel based on the sound signal received for the second period, and match and store the operation speed of the second vessel and the operation vibration information of the second vessel.

According to still another aspect of the present disclosure, there is provided a method for determining speeding of a vessel based on artificial intelligence performed by a system for determining speeding of a vessel based on artificial intelligence, the method including: receiving, by sound signal receiving apparatuses installed at at least two points, a sound signal of a first vessel operating at a preset section; extracting operation vibration information of the first vessel from each sound signal received by the sound signal receiving apparatuses installed at the at least two points; measuring an operation speed of the first vessel from each of the received sound signals; and constructing a database including operation speed range information matching the operation vibration information of the first vessel.

The operation speed range information may include a generable maximum speed of the first vessel when the first vessel generates the operation vibration information and operate, as a result of learning the measured operating speed and the operation vibration information using a preset vibration learning model.

The method may further include: receiving, by the sound signal receiving apparatuses installed at at least two points, a sound signal of a second vessel operating at a preset section; and determining whether the second vessel is speeding based on the sound signal of the second vessel.

According to the embodiment of the present disclosure, there is an advantage in that it is possible to provide the safe operation environment of the vessel by measuring the operation speed of the vessel and controlling whether the speed of the vessel exceeds the speed limit of the vessel.

In particular, according to the embodiment of the present disclosure, there is an advantage in that it is possible to determine whether the speed of the vessel exceeds the speed limit of the vessel by the sound output from the vessel in operation in the environment where the field of vision is obscured.

According to another embodiment of the present disclosure, there is an effect that the database constructed based on the relationship between the output acoustic information of the vessel and the speed information of the vessel corresponding thereto is provided based on the sound and metadata about the vessel. It is possible to precisely measure the speed of the vessel regardless of the type of vessels or the distance from the measurement position by using the database constructed in this way.

Effects of the present disclosure are not limited to the above-mentioned effects, and other effects that are not mentioned will be clearly understood by those skilled in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, preferred embodiments of the present disclosure will be described with reference to the accompanying drawings. Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art can easily understand the scope of the present disclosure. Therefore, the present disclosure will be defined by the scope of the appended claims. Throughout the specification, like reference numerals denote like elements.

Unless defined otherwise, all terms (including technical and scientific terms) used in the present specification have the same meaning as meanings commonly understood by those skilled in the art to which the present disclosure pertains. In addition, terms defined in the commonly used dictionary are not ideally or excessively interpreted unless explicitly defined otherwise. Terms used in the present specification are for explaining the embodiments rather than limiting the present disclosure. Unless explicitly described to the contrary, a singular form includes a plural form in the present specification.

In this specification, operation vibration information of a vessel is a frequency component included in vibration or a sound signal generated from a vessel in operation, and in particular, means vibration information in which a vibration component generated by engine and screw output is coupled with a natural vibration component generated from a structure and material of the vessel.

Hereinafter, an apparatus, a method, and a system for determining speeding of a vessel based on artificial intelligence may each be abbreviated as an apparatus for determining speeding of a vessel, a method for determining speeding of a vessel, and a system for determining speeding of a vessel.

Figure 1:
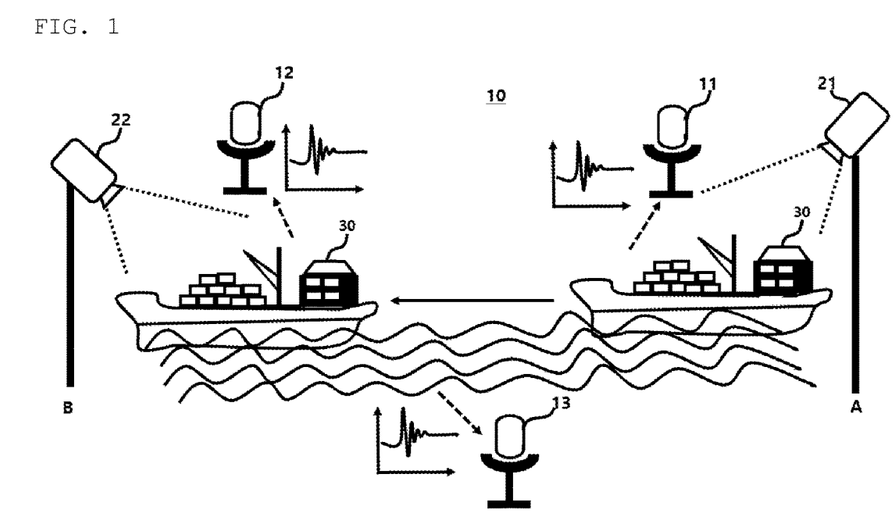
FIG. 1 is an exemplary diagram of a system for determining speeding of a vessel based on artificial intelligence according to an embodiment of the present disclosure.

FIG. 1 is an exemplary diagram of a system for determining speeding of a vessel based on artificial intelligence according to an embodiment of the present disclosure.

Referring to FIG. 1, when a vessel 30 is in operation, a sound signal may be generated. As the vessel 30 operates, engine noise is output, and a sound due to friction generated during a rotation of a screw may be generated. Such noise or sound is composed of a combination of numerous waves, and each wave has physical values of an amplitude, a wavelength, and a frequency. The wave may be referred to as vibration, and the vibration information may include information on at least one of the amplitude, wavelength, and frequency of the wave.

According to an embodiment of the present disclosure, the sound signal, which is the wavelength generated by the vessel in operation, may have the natural vibration component generated by the natural vibration of the vessel 30 according to the structure and material of the vessel 30, and the operation vibration information having the vibration component generated from the engine output or the screw rotation as the vessel 30 operates.

According to another embodiment of the present disclosure, the operation vibration information may further include a vibration component generated in the sea or surrounding environment in which the vessel 30 is operating.

Referring to FIG. 1, for example, a system 10 for determining speeding of a vessel may include a first sound signal receiving apparatus 11, a second sound signal receiving apparatus 12, and a third sound signal receiving apparatus 13 that receive the sound signal generated from the vessel 30.

The system 10 for determining speeding of a vessel may extract the operation vibration information of the vessel 30 based on the sound signal for the first period received from at least one of the sound signal receiving apparatuses 11, 12, and 13. Here, the first period may be a period between a first point in time and a second point in time when the sound signal is received from the sound signal receiving apparatuses 11, 12, and 13 while the vessel 30 is operating.

According to an embodiment of the present disclosure, the system 10 for determining speeding of a vessel may receive a noise signal in the state in which the sound signal generated from the vessel 30 is not received by the sound signal receiving apparatus 11 and the second sound signal receiving apparatus 12, respectively, before the first point in time.

The system 10 for determining speeding of a vessel may also extract the operation vibration information of the vessel 30 by canceling the frequency component of the noise signal with respect to the sound signal received at the first point in time.

That is, noise such as ocean waves and wind noise may exist in a space on an ocean where the speed of the vessel 30 is measured. Such noise may be superimposed on the sound signal generated as the vessel 30 operates, thereby causing a problem in that it is impossible to detect natural vibrations caused by the operation of the vessel 30. Therefore, in order to extract the natural vibration information of the vessel 30 according to the operation, it is possible to extract the operation vibration information of the vessel 30 by applying a noise canceling technique to the sound signal received by the sound signal receiving apparatuses 11, 12, and 13. As the noise canceling technique, for example, an active noise cancellation (ANC) method may be applied, but the embodiment of the present disclosure is not limited thereto.

On the other hand, the system 10 for determining speeding of a vessel may extract a moving speed and direction of the vessel 30 using a Doppler effect and a triangulation technique based on the operation vibration information of the vessel 30 at positions of the first sound signal receiving apparatus 11 and the second sound signal receiving apparatus 12, respectively.

Referring back to FIG. 1, the system 10 for determining speeding of a vessel may include a camera that is installed at at least two points on a preset section in which the vessel 30 operates, and acquires an image of the vessel 30 in operation. In FIG. 1, a first camera 21 installed at point A and a second camera 22 installed at point B are illustrated as examples.

Based on the images acquired from the cameras 11 and 21, the system 10 for determining speeding of a vessel may extract the natural information of the vessel 30 through a preset vessel learning model. The natural information of the vessel 30 may include information such as types of vessel such as a cargo ship, a passenger ship, a container ship, an oil tanker, and a bulk carrier, a size and/or volume of the vessel, an engine type and/or engine size of the vessel, a size of the screw, and the material and structure of the vessel.

In order to generate the preset vessel learning model, the system 10 for determining speeding of a vessel may use a neural network model to extract feature points for an input image of a vessel, and may classify the vessel by type or volume based on the relationship between the feature points and lines, surfaces, and structures formed by a cluster of the feature points.

The input image of the vessel may be a frame image of the images acquired from the cameras 11 and 21. The neural network model may be configured to include at least one of a convolution neural network (CNN), an auto encoder, a feedforward neural network, a radial basis function network, and a kohonen self-organizing neural network and a recurrent neural network (RNN).

The system 10 for determining speeding of a vessel may generate the vessel learning model by matching engine and/or screw data applicable for each volume and/or type of the vessel to the classification result.

The system 10 for determining speeding of a vessel may analyze the images acquired from the cameras 11 and 21 through the vessel learning model to classify the type and volume of the vessel 30 in the images, and identify the type and size of the engine matched to the classified type and volume of the vessel 30. That is, the system 10 for determining speeding of a vessel may extract the natural information of the vessel 30 in operation.

The system 10 for determining speeding of a vessel may match and store identifier information for the vessel 30 with the extracted natural information for the vessel 30.

The system 10 for determining speeding of a vessel may match and store the extracted natural information for the vessel 30 and the extracted operation vibration information for the vessel 30.

As a result, the system 10 for determining speeding of a vessel may match and store the natural information for the vessel 30, the operation vibration information for the vessel 30, and the moving speed of the vessel 30.

As a result, a database including the speed information of the vessel matching the operation vibration information of the vessel may be constructed in the system 10 for determining speeding of a vessel.

When the sound signal of the vessel is input to the system 10 for determining speeding of a vessel, the operation vibration information of the vessel may be extracted, and thus the speed information for the vessel may be extracted from the database and the system 10 for determining speeding of a vessel may output the extracted speed information for the vessel. To this end, the system 10 for determining speeding of a vessel may also include a display unit (not illustrated).

According to an embodiment, the system 10 for determining speeding of a vessel may be received by the sound signal receiving apparatuses 11 and 12 when a sound signal is generated by the vessel 30 for a second period different from the first period described above. At this time, the system 10 for determining speeding of a vessel may extract the operation vibration information of the vessel 30, and may determine whether the vessel 30 is speeding by obtaining the speed information of the vessel corresponding to the operation vibration information from the constructed database. The operation vibration information (hereinafter, first operation vibration information) extracted from the operation for the above-described first period and the operation vibration information (second operation vibration information) extracted from the operation for the second period may be different from each other, and at least one of the amplitude and frequency of the operation vibration information of the second period is higher than that of the first period when the vessel 30 is operating smaller than or equal to the speed limit for the first period, but the vessel 30 is speeding for the second period.

According to another embodiment, the system 10 for determining speeding of a vessel may be received by the sound signal receiving apparatuses 11 and 12 when a sound signal from a vessel (hereinafter, second vessel) different from the vessel 30 is generated for the second period. The system 10 for determining speeding of a vessel may extract the operation vibration information (hereinafter, third operation vibration information) of the second vessel from the sound signal of the second vessel. The system 10 for determining speeding of a vessel may determine whether the second vessel is speeding by acquiring the speed information of the vessel in the database constructed on the basis of a third operation vibration information.

According to another embodiment, the system 10 for determining speeding of a vessel may determine whether the second vessel is speeding based on the speed range information of the vessel 30 in the database.

For example, when the speed information matching the third operation vibration information is not in the database, the system 10 for determining speeding of a vessel may also determine, based on the first operation vibration information, whether the second vessel is speeding. To this end, the system 10 for determining speeding of a vessel may compare the natural information of the vessel 30 and the natural information of the second vessel, thereby generating a conversion function capable of converting the speed information corresponding to the first operation vibration information into the speed information corresponding to the third operation vibration information.

Even if the sound signal with the operation vibration information without the matching value is received in the database, the system 10 for determining speeding of a vessel may estimate, by using the conversion function, the speed information of the second vessel which is a sound source of the sound signal. In addition, the system 10 for determining speeding of a vessel may determine whether the second vessel is speeding based on the estimated speed information.

Meanwhile, the system 10 for determining speeding of a vessel may match the operation speeds of the second vessel measured based on the generated natural information of the second vessel, the third operation vibration information, and the sound signal received for the second period, and store the matched operation speeds in the database.

In an embodiment, the system 10 for determining speeding of a vessel may measure the speed of the second vessel operating at the preset section through the cameras 21 and 22, and verify the determination result on whether the second vessel is speeding based on the measured speed of the second vessel.

The system 10 for determining speeding of a vessel may include an apparatus for determining speeding of a vessel. The apparatus for determining speeding of a vessel may control functions and operations of each component of the system 10 for determining speeding of a vessel. According to an embodiment of the present disclosure, the extraction of the operation vibration information from the sound signal of the system 10 for determining speeding of a vessel described above, and the extraction of the natural information of the vessel 30 from the image of the vessel 30 may be performed by the apparatus for determining speeding of a vessel.

Hereinafter, the apparatus for determining speeding of a vessel will be described in detail with reference to FIG. 2.

Figure 2:
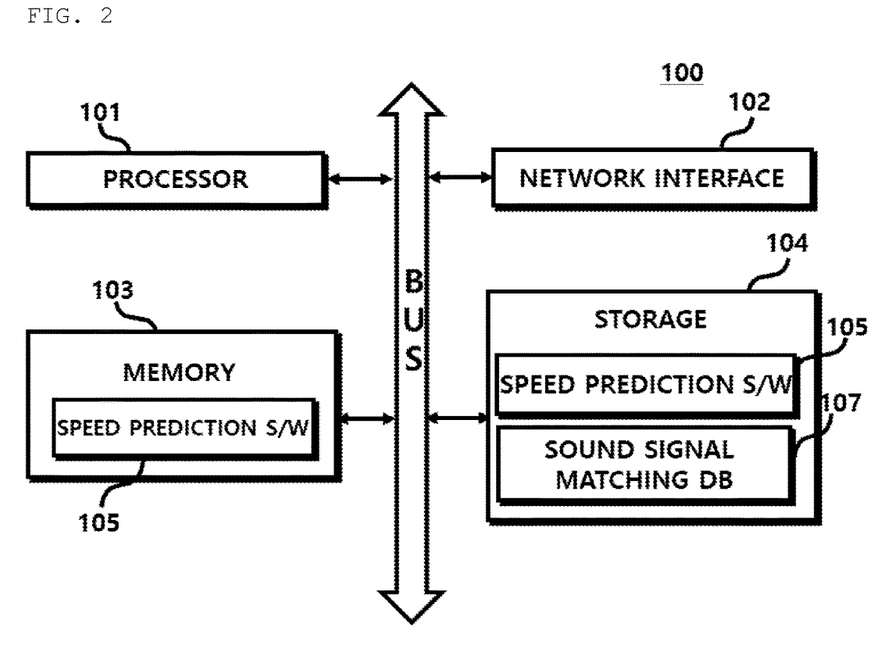
FIG. 2 is a block diagram of an apparatus for determining speeding of a vessel based on artificial intelligence according to another embodiment of the present disclosure.

FIG. 2 is a block diagram of an apparatus for determining speeding of a vessel based on artificial intelligence according to another embodiment of the present disclosure. An apparatus 100 for determining speeding of a vessel may be a fixed computing device such as a server device or a desktop PC, but embodiments of the present disclosure are not limited thereto.

The apparatus 100 for determining speeding of a vessel may include one or more processors 101, a network interface 102 to which an external device is connected or which communicates with the external device, a memory 103 into which a computer program executed by the processor 101 is loaded, a storage 104 that stores a computer program, and one or more software 105 and a sound signal matching database DB stored in the storage 104.

The processor 101 controls the overall operation of each component of the apparatus 100 for determining speeding of a vessel. The processor 101 may be configured to include a central processing unit (CPU), a micro-processor unit (MPU), a micro controller unit (MCU), or any type of processor well known in the technical field of the present disclosure. Also, the processor 101 may perform a calculation on at least one application or program for executing the method according to the embodiments of the present disclosure. The apparatus 100 for determining speeding of a vessel may include one or more processors.

The network interface 102 supports wired/wireless Internet communication of the apparatus 100 for determining speeding of a vessel. In addition, the network interface 102 may support various communication methods other than the Internet, which is a public communication network. In addition, the network interface 102 may provide connection with the external device. To this end, the network interface 102 may be configured to include at least one of a communication module and a connection terminal well known in the technical field of the present disclosure. Here, the external device may be an external terminal that accesses the sound signal receiving apparatuses 11, 12, and 13 installed in the area in which the preset section is formed or the sound signal matching database 107 to request the speed information of the vessel in operation.

Figure 3:
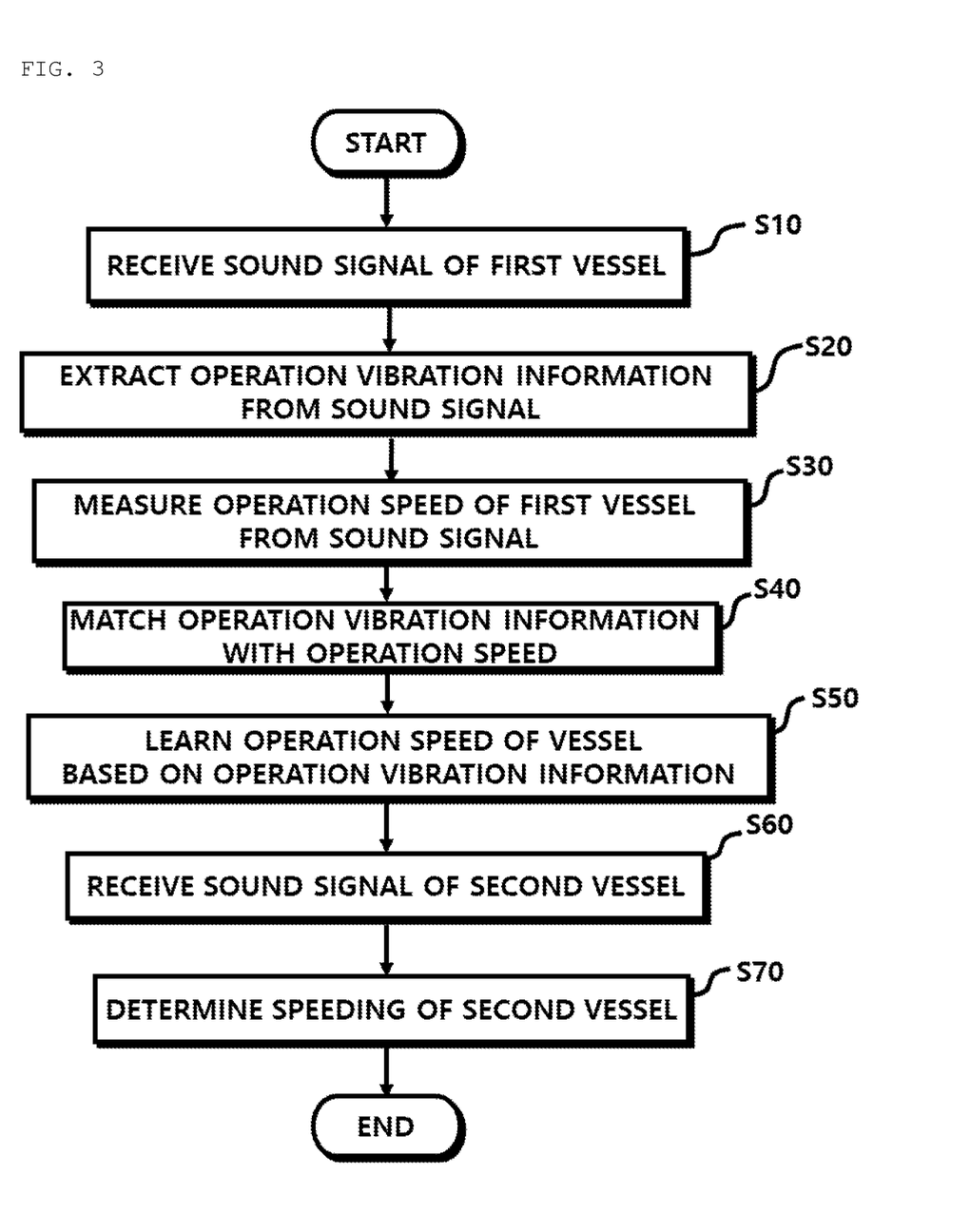
FIG. 3 is a flowchart of a method for determining speeding of a vessel based on artificial intelligence according to still another embodiment of the present disclosure.

The memory 103 stores various types of data, commands and/or information. The memory 103 may load one or more programs 105 from the storage 104 to execute the embodiments of the present disclosure. In FIG. 3, the memory 103 may be, for example, a RAM.

The storage 104 may non-transitorily store the one or more programs 105 and the sound signal matching database 107. FIG. 3 illustrates speed prediction software 105 as an example of the one or more programs 105. The speed prediction software 105 may be referred to as a speed prediction program.

The storage 104 may be configured to include a nonvolatile memory, such as a read only memory (ROM), an erasable programmable ROM (EPROM), an electrically erasable programmable ROM (EEPROM), and a flash memory, a hard disk, a removable disk, or any well-known computer-readable recording medium in the art to which the present disclosure belongs.

According to an embodiment of the present disclosure, the speed prediction software 105 may support to extract the speed information of the vessel based on the sound signal received by the apparatus 100 for determining speeding of a vessel.

According to an embodiment, when the sound signal is input, the speed prediction software 105 needs to detect only the sound signal generated by the actual operation of the vessel 30. The detection of the sound signal has a great influence on the recognition of the vessel 30 and/or the accuracy of the speed information extraction of the vessel 30. This is because even if the improved operation vibration information detection algorithm is used, it is difficult to expect a good recognition rate when the detection of the sound signal is not performed properly.

In particular, since noise is often included in the operating environment, it is necessary to apply a noise canceling technique in order to increase the recognition of the vessel 30 and/or the accuracy of the speed information extraction of the vessel 30 as described above. Accordingly, the speed prediction software 105 may include a program capable of improving the precision of the detection of the sound signal, such as the noise canceling algorithm.

In an embodiment, the speed prediction software 105 extracts features from the sound signal according to the operation of the vessel 30. In the case of the vessel, since the sound signal changes very complexly according to the year of the model, kind, weight, volume, type of the engine, the rotation speed of the screw, the operation speed, and the like, the feature extraction that may well represent the features of the sound signal of the vessel 30 in operation is a very important issue. That is, through feature extraction, the vessel 30 and other vessels may be distinguished, and the speeds of each section of the vessel 30 may be distinguished. In particular, in the feature extraction process, there is a need to extract information that can increase discrimination from sound signals of other vessels or vessels operating at different speeds while unnecessarily increasing the consistency between the sound signals of the same vessel or the vessel operating at the same speed. Information that may give consistency and discrimination in this way is called a feature vector. This feature vector may correspond to the operation vibration information of the vessel in the embodiment of the present disclosure.

In an embodiment, the speed prediction software 105 may include an acoustic model for modeling and comparing signal characteristics of the received sound signal in order to extract the speed information of the vessel in operation based on the operation vibration information.

The acoustic model is divided into a direct comparison method that sets a recognition target as speed information again and compares the set speed information with the operation vibration information of the input signal, and a statistical method that statistically processes and uses the speed information that is the recognition target. According to the embodiment of the present disclosure, the acoustic model may include at least one of a statistical algorithm, which uses a probability value, an average, and a variance, such as an HMM, as a comparison target and an algorithm using an artificial neural network.

In particular, according to the embodiment of the present disclosure, the speed prediction software 105 may include a machine learning model generated based on the sound signal matching database 107 to be described later. Here, the machine learning model may include the artificial neural network described above, and in particular, may be configured to include a convolution neural network (CNN). The machine learning model may be called a vibration learning model.

For example, when the vibration learning model is based on the convolutional neural network, as the vibration learning model is driven by the processor 101, the feature value of the sound signal is filtered, and only the operation vibration information among several sound signals is newly taken through the convolution calculation. By repeatedly learning this, the operation vibration information for each speed of the vessel may be classified. Alternatively, the speed information matching each operation vibration information of the vessel may be identified.

Specifically, as the apparatus 100 for determining speeding of a vessel learns the operation vibration information for the first period stored in the sound signal matching database 107 and the operation speed of the vessel 30 through the preset vibration learning model, the apparatus 100 for determining speeding of a vessel may generate the speed range information of the vessel 30 corresponding to the sound signal of the vessel 30.

Figure 4:
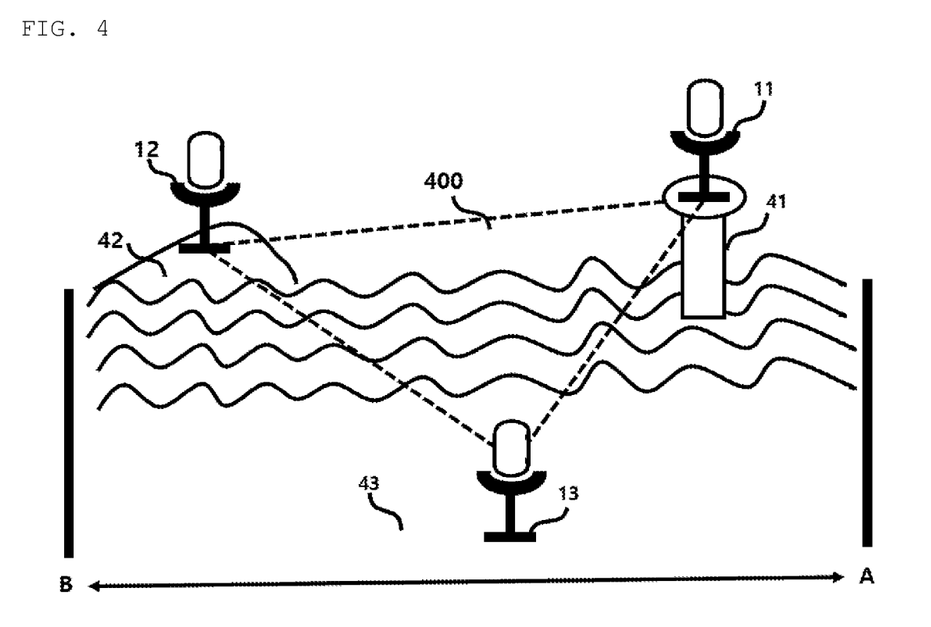
FIG. 4 is an exemplary diagram of a sound signal receiving apparatus, referenced in some embodiments of the present disclosure.

FIG. 3 is a flowchart of a method for determining speeding of a vessel based on artificial intelligence according to still another embodiment of the present disclosure. FIG. 4 is an exemplary diagram of a sound signal receiving apparatus, referenced in some embodiments of the present disclosure.

Hereinafter, each step of the method for determining speeding of a vessel is performed by the system 10 for determining speeding of a vessel based on artificial intelligence.

Referring to FIGS. 1, 3, and 4, the system 10 for determining speeding of a vessel may receive, by the sound signal receiving apparatuses 11, 12, and 13 installed at at least two points, the sound signal of the vessel 30 (hereinafter, first vessel), which is operating at a preset section, for example, from point A to point B (S10).

In particular, FIG. 4 illustrates, as an example, the case where the first sound signal receiving apparatus 11 is installed on a buoy 41, the second sound signal receiving apparatus 12 is installed on an offshore structure or a rock 42, and the third sound signal receiving apparatus 13 is installed on a land 43. Referring to FIG. 4, the first sound signal receiving apparatus 11, the second sound signal receiving apparatus 12, and the third sound signal receiving apparatus 13 form an area 400, and the at least two sound signal receiving apparatuses may use the Doppler effect and the triangulation technique during the operation of the vessel at the preset section to measure the position and speed of the vessel.

The system 10 for determining speeding of a vessel may extract the operation vibration information of the first vessel from each sound signal received from the sound signal receiving apparatuses 11 and 12 installed at at least two points (S20). In addition, the system 10 for determining speeding of a vessel may measure the operation speed of the first vessel 30 from each received sound signal (S30).

A database composed of the speed range information including the operation vibration information of the first vessel 30 and the measured operation speed matching thereto may be constructed (S40). At this time, the operation speed information of the first vessel 30 may be learned based on the operation vibration information using the preset vibration learning model (S50). The vibration learning model may define the relationship between three pieces of information, such as the sound signal, the operation vibration information, and the speed information, and classify the remaining two pieces of information based on one of the pieces of information.

The speed range information may include at least one of the maximum and minimum speeds of the first vessel 30 that may be generated when the first vessel 30 operates while generating the operation vibration information, as a result of learning the measured operation speed and operation vibration information.

Next, the system 10 for determining speeding of a vessel may receive the sound signal of the second vessel operating at the preset section from the sound signal receiving apparatuses 11 and 12 installed at the at least two points (S60). The system 10 for determining speeding of a vessel may determine whether the second vessel is speeding based on the sound signal of the second vessel (S70).

Figure 5:
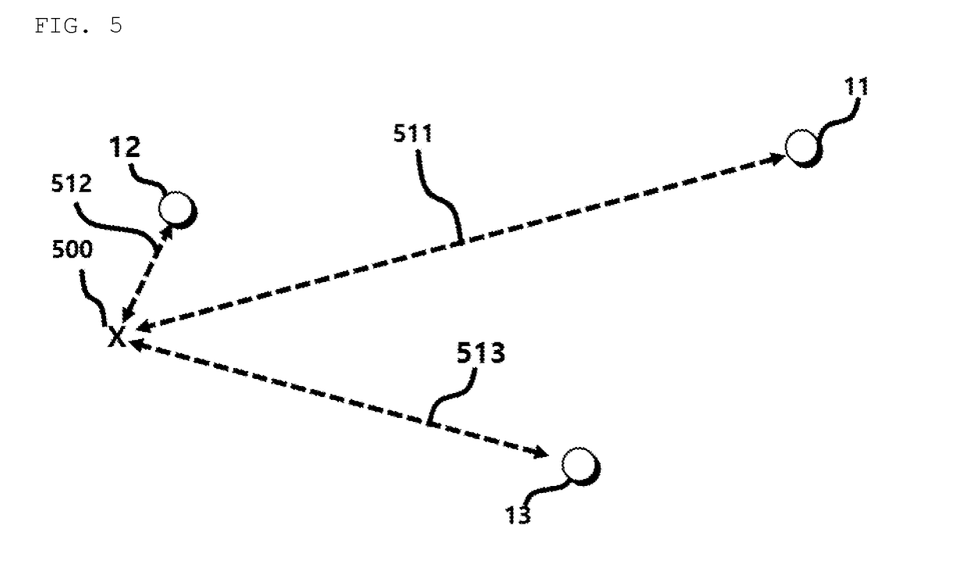
FIGS. 5 and 6 are exemplary diagrams for explaining a method for identifying a vessel based on a sound signal and extracting an operation route, which is referenced in some embodiments of the present disclosure.
Figure 6:
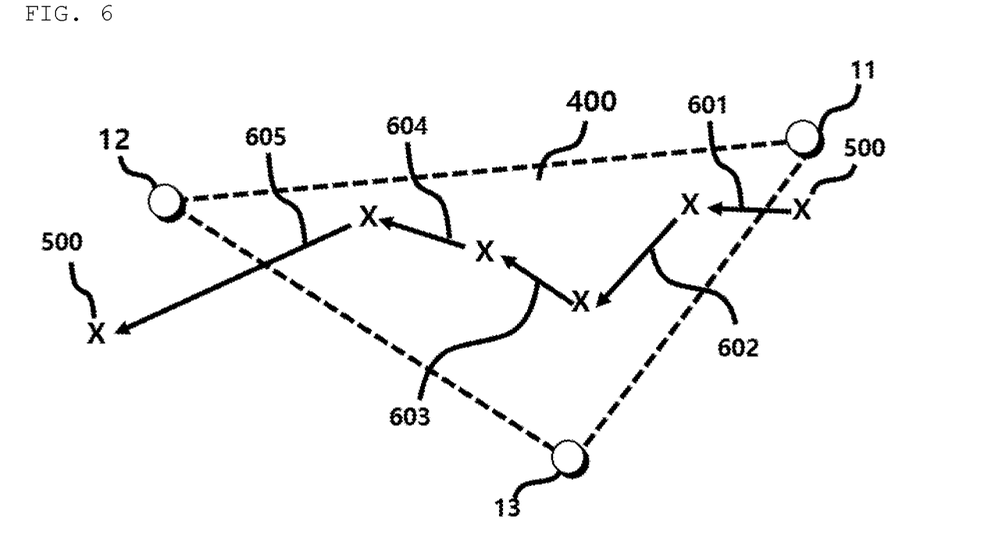

FIGS. 5 and 6 are exemplary diagrams for explaining a method for identifying a vessel based on a sound signal and extracting an operation route, which is referenced in some embodiments of the present disclosure.

In FIG. 5, the first sound signal receiving apparatus 10, the second sound signal receiving apparatus 20, and the third sound signal receiving apparatus 30 have been simplified to represent the installation point, and a vessel 500 in operation is represented by position X.

Referring to FIG. 5, the first sound signal receiving apparatus 11 may detect a distance 511 based on the sound signal of the vessel 30 at the position X. The second sound signal receiving apparatus 12 may detect the distance 512 based on the sound signal of the vessel 500 at the position X and the third sound signal receiving apparatus 13 may detect a distance 513 based on the sound signal of the vessel 500 at the position X.

The system 10 for determining speeding of a vessel may detect the distance of the vessel 500 far away from the sound signal receiving apparatuses 11, 12, and 13 through the Doppler effect, and in step S30 of FIG. 3, may measure the position and speed of the vessel 500 using the triangulation technique at at least two points where the sound signal receiving apparatuses 11, 12, and 13 are installed.

FIG. 6 illustrates the case where the vessel 500 proceeds along a first route 601, a second route 602, a third route 603, a fourth route 604, and a fifth route 605, and operates the area 400, as an example.

The system 10 for determining speeding of a vessel may receive noise from the area 400 and determine the received noise as a default vibration, before the vessel operates on the first route 601, and cancel, from the operation vibration information, the noise due to the sound signal received during the operation on from the first route 601 to the fifth route 605.

The system 10 for determining speeding of a vessel may extract the operation vibration information from the first sound signal receiving apparatus 11 and the second sound signal receiving apparatus 12, respectively, based on the sound signal of the vessel 500 which is operating on the first route 601 at the first point in time.

The system 10 for determining speeding of a vessel may receive the sound signal on the second route 602 at the second point in time from the first sound signal receiving apparatus 11 and the second sound signal receiving apparatus 12, and may determine whether the vibration component matching the operation vibration information of the vessel 500 is extracted from a sound signal of a specific vessel.

When the motion vibration information of the vessel 500 is extracted, the sound source of the sound signal on the second route 602 may be identified as the vessel 500.

The system 10 for determining speeding of a vessel may identify an operation speed and an operation direction between the first point in time and the second point in time of the vessel 500 based on the extracted operation vibration information.

Furthermore, the system 10 for determining speeding of a vessel may measure the distance of the first route 601, the second route 602, the third route 603, the fourth route 604, and the fifth route 605 to determine a total operation distance on the preset section.

In addition, the system 10 for determining speeding of a vessel may measure the operation speed for each route, and determine whether the vessel 500 is speeding for each route based on the total operation distance.

According to an embodiment, a plurality of vessels may be operating on the area 400. The system 10 for determining speeding of a vessel may receive the plurality of sound signals from the plurality of vessels at the first point in time from the first sound signal receiving apparatus 11 and the second sound signal receiving apparatus 12, respectively.

The system 10 for determining speeding of a vessel may identify the plurality of vessels corresponding to the plurality of sound signals based on the operation vibration information classified by the preset vibration learning model.

In addition, the system 10 for determining speeding of a vessel may specify the vessel 500 among the plurality of vessels based on the extracted operation vibration information.

According to another embodiment of the present disclosure, the system 10 for determining speeding of a vessel may compare the vibration component of the operation frequency of the vessel 500 extracted from the sound signal of the first point in time received by the first sound signal receiving apparatus 11 and the second sound signal receiving apparatus 12 and the vibration component of the sound signal of the second point in time received by the third sound signal receiving apparatus 13, thereby verifying the vessel 500.

Figure 7:
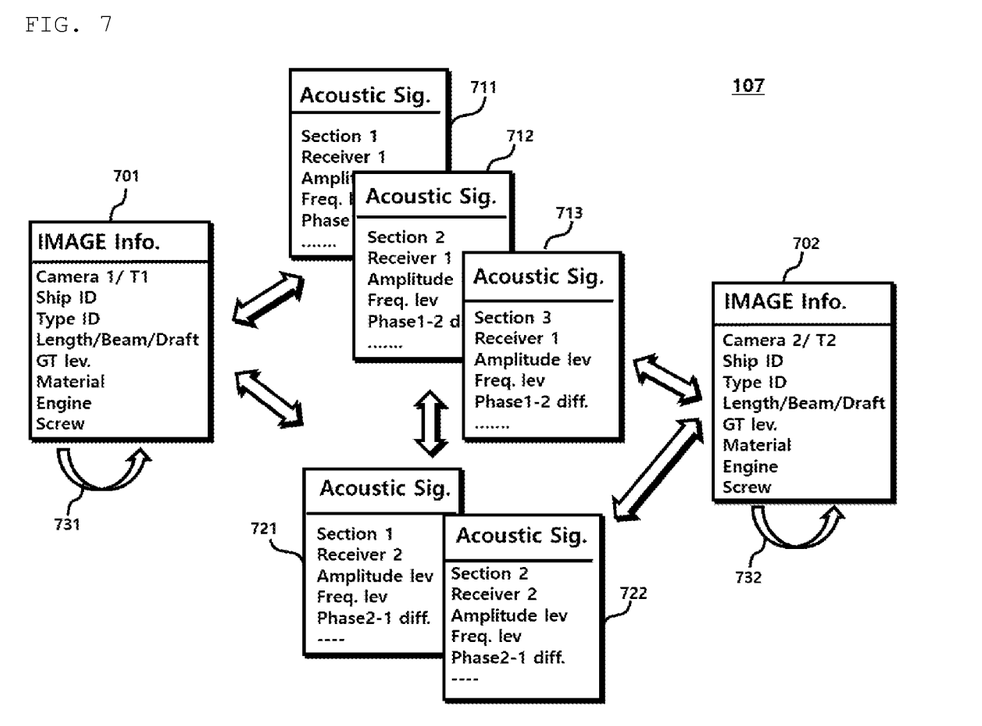
FIG. 7 is an exemplary diagram for describing a method for matching a sound signal with natural information of a vessel, which is referenced in some embodiments of the present disclosure.

FIG. 7 is for describing a method for matching a sound signal and vessel natural information, which is referred to in some embodiments of the present disclosure, and is an example of the sound signal matching database 107 of FIG. 2.

FIG. 7 illustrates, as an example, natural information 701 of the vessel 30 extracted from the first image acquired by the first camera 21 of FIG. 1, and natural information 702 of the vessel 30 extracted from the second image acquired by the second camera 22.

Referring to FIG. 7, the natural information 701 and 702 may be learned and/or extracted 731 and 732 by a vessel learning model as the first image and the second image are acquired.

According to an embodiment, the first sound signal receiver 11 may receive a sound signal 711 at the first point in time, a sound signal 712 at the second point in time, and a sound signal 713 at the third point in time. Further, the second sound signal receiver 12 may receive a sound signal 721 at the first point in time and a sound signal 722 at the second point in time. Although not illustrated, information on sound signals received at a plurality of points in time of the first sound signal receiver 11, the second sound signal receiver 12, and the third sound signal receiver 13 may be additionally included in the database 107.

The sound signals 711, 712, 713, 721, and 722 of FIG. 7 may include information on a received point in time, received information on the sound signal receiving apparatus, and amplitude, frequency, and phase information of a received signal. Some of the sound signal information may include phase information reflected as a result of analysis of accumulated and received sound signals.

In addition, the system 10 for determining speeding of a vessel may extract the operation vibration information from the plurality of accumulated sound signals 711, 712, 713, 721, and 722, respectively, and may measure the position and operation speed of the vessel by using the information on the plurality of accumulated sound signals 711, 712, 713, 721, and 722.

The system 10 for determining speeding of a vessel may set the relationship between the sound signal, the operation vibration information, and the operation speed by using the preset vibration learning model, and construct a classification system for each information.

Figure 8:
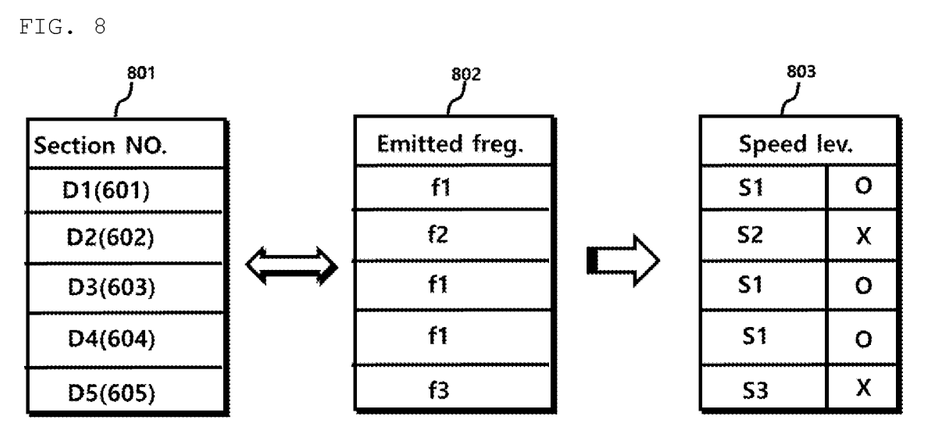
FIG. 8 is an exemplary diagram for describing a difference in operation frequencies for each operation section of a vessel, which is referenced in some embodiments of the present disclosure.

FIG. 8 is an exemplary diagram for describing a difference in operation frequencies for each operation section of a vessel, which is referenced in some embodiments of the present disclosure.

Referring to FIG. 8, the system 10 for determining speeding of a vessel may extract operation vibration information 802 for each route from accumulated data 801 of the route information 601, 602, 603, 604, and 605 of FIG. 6 matching the sound signal of the vessel 500 operating at the preset section.

The system 10 for determining speeding of a vessel may measure the speed of the vessel 500 for each route of FIG. 6 based on the operation vibration information 802, and may determine whether the vessel is speeding in each route.

The determination and/or calculation methods of a controller 70 according to an embodiment of the present disclosure described with reference to the accompanying drawings so far may be performed by executing a computer program implemented as a computer-readable code. The computer program may be transmitted from a first computing device to a second computing device through a network such as the Internet and installed in the second computing device, and as a result, may be used in the second computing device. Both the first computing device and the second computing device include a server device, a fixed computing device such as a desktop PC, and a mobile computing device such as a notebook, a smartphone, and a tablet PC.

Although the embodiments of the present disclosure have been described with reference to the accompanying drawings, those skilled in the art will appreciate that various modifications and alterations may be made without departing from the spirit or essential feature of the present disclosure. Therefore, it is to be understood that the exemplary embodiments described hereinabove are illustrative rather than being restrictive in all aspects.

What is claimed is:

1. An apparatus for determining speeding of a vessel based on artificial intelligence, the apparatus comprising:
   one or more processors;
   a network interface receiving a sound signal from at least one sound signal receiving apparatus;
   a memory loading a computer program executed by the processor; and
   a database for matching and storing the sound signal and speed information of a vessel corresponding to the sound signal and a storage for storing the computer program,
   wherein the program includes:
   an operation of extracting operation vibration information of a vessel in operation based on a sound signal received at a first point in time from each of a first sound signal receiving apparatus and a second sound signal receiving apparatus among the at least one sound signal receiving apparatus;
   an operation of receiving a sound signal at a second point in time from the first sound signal receiving apparatus and the second sound signal receiving apparatus;
   an operation of identifying a sound source of the second sound signal as the vessel by first extracting a vibration component matching the operation vibration information from the sound signal at the second point in time; and
   an operation of identifying, based on the operation vibration information, an operation speed and an operation direction between the first point in time and the second point in time of the vessel.

2. The apparatus according to claim 1, wherein the operation vibration information is a combination of a natural vibration component generated by natural vibration of the vessel according to a structure and material of the vessel and a vibration component generated from an engine output as the vessel operates.

3. The apparatus according to claim 1, wherein the operation of extracting the operation vibration information of the vessel in operation includes:
   an operation of receiving a noise signal, in a state in which the sound signal of the vessel is not received, from each of the first sound signal receiving apparatus and the second sound signal receiving apparatus, before the first point in time; and
   an operation of extracting the operation vibration information of the vessel by canceling a frequency component of the noise signal with respect to the sound signal received at the first point in time.

4. The apparatus according to claim 1, wherein the at least one sound signal receiving apparatus further includes a third sound signal receiving apparatus,
   the program further includes an operation of receiving the sound signal at the second point in time from the third sound signal receiving apparatus, and
   the operation of identifying a sound source of the second sound signal as the vessel includes an operation of
second extracting a vibration component matching the operation vibration information from the sound signal at the second point in time received by the third sound signal receiving apparatus; and
   an operation of identifying the sound source of the second sound signal received by the second sound signal receiving apparatus as the vessel, based on the second extracted frequency component.

5. The apparatus according to claim 1, wherein the operation of extracting the operation vibration information of the vessel in operation includes:
   an operation of receiving a plurality of sound signals from a plurality of vessels at the first point in time from each of the first sound signal receiving apparatus and the second sound signal receiving apparatus;
   an operation of identifying the plurality of vessels corresponding to the plurality of sound signals based on the operation vibration information classified by a preset vibration learning model; and
   an operation of specifying the vessel among the plurality of vessels based on the extracted operation vibration information.

6. A system for determining speeding of a vessel based on artificial intelligence, the system comprising:
   at least one sound signal receiving apparatus receiving a sound signal generated from a first vessel;
   a camera installed at least two points on a preset section in which the first vessel operates and obtaining an image of the first vessel in operation; and
   an apparatus for determining speeding of a vessel extracting natural information of the first vessel through a preset vessel learning model based on an image acquired from the camera, extracting operation vibration information of the first vessel based on a sound signal received for a first period from the sound signal receiving apparatus, matching and storing the extracted natural information of the first vessel and the operation vibration information of the first vessel, measuring an operation speed of the first vessel based on the sound signal received for the first period, and matching and storing the operation speed of the first vessel and the operation vibration information of the first vessel.

7. The system according to claim 6, wherein the apparatus for determining speeding of a vessel generates speed range information of the first vessel corresponding to the sound signal of the first vessel as the stored operation vibration information for the first period and the operation speed of the first vessel are learned through a preset vibration learning model.

8. The system according to claim 7, wherein the apparatus for determining speeding of a vessel extracts operation vibration information of a second vessel from a sound signal of the second vessel when the sound signal of the second vessel in operation for the second period is received from the sound signal receiving apparatus, and determines whether the second vessel is speeding based on the extracted operation vibration information of the second vessel and the generated speed range information of the first vessel.

9. The system according to claim 7, wherein the apparatus for determining speeding of a vessel measures the speed of the second vessel operating at the preset section through the camera, and verifies a result of determining whether the second vessel is speeding based on the measured speed of the second vessel.

10. The system according to claim 8, wherein the apparatus for determining speeding of a vessel generates natural information of the second vessel using the preset vessel learning model based on the extracted natural information of the first vessel, matches and stores the generated natural information of the second vessel and the extracted operation vibration information of the second vessel, measures an operation speed of the second vessel based on the sound signal received for the second period, and matches and stores the operation speed of the second vessel and the operation vibration information of the second vessel.

11. A method for determining speeding of a vessel based on artificial intelligence performed by a system for determining speeding of a vessel based on artificial intelligence, the method comprising:

receiving, by sound signal receiving apparatuses installed at at least two points, a sound signal of a first vessel operating at a preset section;

extracting operation vibration information of the first vessel from each sound signal received by the sound signal receiving apparatuses installed at the at least two points;

measuring an operation speed of the first vessel from each of the received sound signals; and     constructing a database including operation speed range information matching the operation vibration information of the first vessel.

wherein the operation speed range information includes a generable maximum speed of the first vessel when the first vessel generates the operation vibration information and operates, as a result of learning the measured operating speed and the operation vibration information using a preset vibration learning model, and the method further includes:

receiving, by the sound signal receiving apparatuses installed at the at least two points, a sound signal of a second vessel operating at the preset section; and determining whether the second vessel is speeding based on the sound signal of the second vessel.

\* \* \* \* \*